United States Patent
Lim et al.

(10) Patent No.: US 11,062,426 B2
(45) Date of Patent: Jul. 13, 2021

(54) ELECTRONIC DEVICE AND IMAGE PROCESSING METHOD

(71) Applicant: Samsung Electronics Co., Ltd., Suwon-si (KR)

(72) Inventors: Chaewhan Lim, Suwon-si (KR); Myunghun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/292,981

(22) Filed: Mar. 5, 2019

(65) Prior Publication Data

US 2019/0272619 A1    Sep. 5, 2019

(30) Foreign Application Priority Data

Mar. 5, 2018 (KR) .................. 10-2018-0025857

(51) Int. Cl.
    *G06T 3/40*     (2006.01)
    *G06T 7/55*     (2017.01)
    *G06K 9/00*     (2006.01)
    *H04N 5/232*    (2006.01)
    *H04N 5/247*    (2006.01)
    *H04N 5/225*    (2006.01)

(52) U.S. Cl.
    CPC ........ *G06T 3/4038* (2013.01); *G06K 9/00664* (2013.01); *G06T 7/55* (2017.01); *H04N 5/2258* (2013.01); *H04N 5/23238* (2013.01); *H04N 5/247* (2013.01)

(58) Field of Classification Search
    CPC ....... G06T 3/4038; G06T 7/55; G06T 7/0028; H04N 5/2258; H04N 5/247; H04N 5/23238; H04N 13/0242; H04N 5/265; G06K 9/00664
    See application file for complete search history.

(56) References Cited

U.S. PATENT DOCUMENTS 6,486,908 B1    11/2002    Chen et al.
7,317,473 B2     1/2008    Chen et al.
                 (Continued)

FOREIGN PATENT DOCUMENTS

WO    2017/003557 A1    1/2017

OTHER PUBLICATIONS

International Search Report dated Jul. 3, 2019, issued in International Patent Application No. PCT/KR2019/002538.
(Continued)

*Primary Examiner* — Dramos Kalapodas
(74) *Attorney, Agent, or Firm* — Jefferson IP Law, LLP

(57) ABSTRACT

An electronic device is provided. The electronic device includes image sensors configured to include a plurality of pairs of image sensors, each pair of image sensors facing in substantially the same direction and generating image data and each of which has a different field of view, a processor configured to be operatively connected to the image sensors, and a memory configured to be operatively connected to the processor. The memory stores instructions, when executed, causing the processor to receive at least one set of image data from the pairs of image sensors, recognize at least one object from the image data, determine depth information of the at least one object, and stitch the at least one set of image data using the at least one object and the depth information.

21 Claims, 13 Drawing Sheets

(56) References Cited

U.S. PATENT DOCUMENTS

| | | |
|---|---|---|
| 7,852,376 B2 | 12/2010 | Chen et al. |
| 8,717,405 B2 | 5/2014 | Li et al. |
| 9,098,926 B2 * | 8/2015 | Quan ..................... G06T 17/00 |
| 9,355,433 B1 | 5/2016 | Adsumilli et al. |
| 9,466,109 B1 | 10/2016 | Adsumilli et al. |
| 9,478,008 B1 | 10/2016 | Adsumilli et al. |
| 9,652,667 B2 | 5/2017 | MacMillan et al. |
| 9,652,848 B2 | 5/2017 | Adsumilli et al. |
| 9,681,046 B2 | 6/2017 | Adsumilli et al. |
| 9,699,380 B2 | 7/2017 | Somanath et al. |
| 9,754,159 B2 | 9/2017 | Macmillan et al. |
| 9,760,768 B2 | 9/2017 | Macmillan et al. |
| 9,842,624 B2 | 12/2017 | Das et al. |
| 10,084,961 B2 | 9/2018 | MacMillan et al. |
| 2003/0063089 A1 | 4/2003 | Chen et al. |
| 2003/0063816 A1 | 4/2003 | Chen et al. |
| 2008/0074500 A1 | 3/2008 | Chen et al. |
| 2011/0316963 A1 * | 12/2011 | Li ....................... H04N 13/243 348/14.1 |
| 2012/0133639 A1 * | 5/2012 | Kopf ..................... G06T 3/4038 345/419 |
| 2014/0111650 A1 * | 4/2014 | Georgiev .............. G06T 3/4038 348/159 |
| 2015/0154776 A1 * | 6/2015 | Zhang ..................... G06T 11/60 382/284 |
| 2015/0254871 A1 | 9/2015 | Macmillan et al. |
| 2015/0256746 A1 | 9/2015 | Macmillan et al. |
| 2015/0256808 A1 | 9/2015 | Macmillan et al. |
| 2016/0086379 A1 * | 3/2016 | Sadi ........................ G06F 3/167 345/633 |
| 2016/0088287 A1 * | 3/2016 | Sadi ....................... H04N 19/54 348/43 |
| 2016/0191795 A1 * | 6/2016 | Han .......................... B60R 1/00 348/36 |
| 2017/0004622 A1 | 1/2017 | Adsumilli et al. |
| 2017/0006219 A1 * | 1/2017 | Adsumilli ........... H04N 5/23219 |
| 2017/0006220 A1 * | 1/2017 | Adsumilli .............. H04N 5/247 |
| 2017/0126968 A1 | 5/2017 | Somanath et al. |
| 2017/0140791 A1 * | 5/2017 | Das .......................... G06T 7/13 |
| 2017/0150046 A1 | 5/2017 | Sondhi |
| 2017/0295318 A1 | 10/2017 | Macmillan et al. |
| 2018/0012078 A1 * | 1/2018 | Pournaghi .......... G06K 9/00718 |

OTHER PUBLICATIONS

Partial European Search Report dated Jul. 15, 2019, issued in European Patent Application No. 19160589.8-1209.

* cited by examiner

ELECTRONIC DEVICE AND IMAGE PROCESSING METHOD

CROSS-REFERENCE TO RELATED APPLICATION(S)

This application is based on and claims priority under 35 U.S.C. § 119(a) of a Korean patent application number 10-2018-0025857, filed on Mar. 5, 2018, in the Korean Intellectual Property Office, the disclosure of which is incorporated by reference herein in its entirety.

BACKGROUND

1. Field

The disclosure relates to an electronic device for capturing or processing images and a method for processing captured images.

2. Description of Related Art

Various types of electronic devices, imaging devices, or camera devices) capable of capturing photos or videos have been used. Recently, various types of electronic devices, each of which includes a plurality of cameras for capturing virtual reality (VR) images or three-dimensional (3D) images, have been developed. For example, an electronic device may include a plurality of cameras (or a plurality of image sensors) arranged such that angles of view are at least partially overlapped with each other. The electronic device may stitch image data collected by the plurality of cameras together to generate a panorama image, a 360-degree image, a 3D image, or the like.

The above information is presented as background information only to assist with an understanding of the disclosure. No determination has been made, and no assertion is made, as to whether any of the above might be applicable as prior art with regard to the disclosure.

SUMMARY

When stitching image data collected by means of a plurality of cameras, an electronic device according to the related art may generate a stitching image including a combination line (e.g., a seamline) by default settings. When a combination line is overlapped with an object in which a user has an interest, it may cause a distortion or a sense of difference of the image to result in an inconvenience to the user.

When the user wants to move the combination line on the stitching image, he or she should move the combination line manually using a separate program or application.

Aspects of the disclosure are to address at least the above-mentioned problems and/or disadvantages and to provide at least the advantages described below. Accordingly, an aspect of the disclosure is to provide an electronic device for capturing or processing images and a method for processing captured images.

Additional aspects will be set forth in part in the description which follows and, in part, will be apparent from the description, or may be learned by practice of the presented embodiments.

In accordance with an aspect of the disclosure, an electronic device is provided. The electronic device includes a plurality of pairs of image sensors, each pair of image sensors facing substantially the same direction and generating image data and each of which has a different field of view, a processor operatively connected to the image sensors, and a memory operatively connected to the processor. The memory may store instructions that, when executed, cause the processor to receive at least one set of image data from the pairs of image sensors, recognize at least one object from the image data, determine depth information of the at least one object, and stitch the at least one set of image data using the at least one object and the depth information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
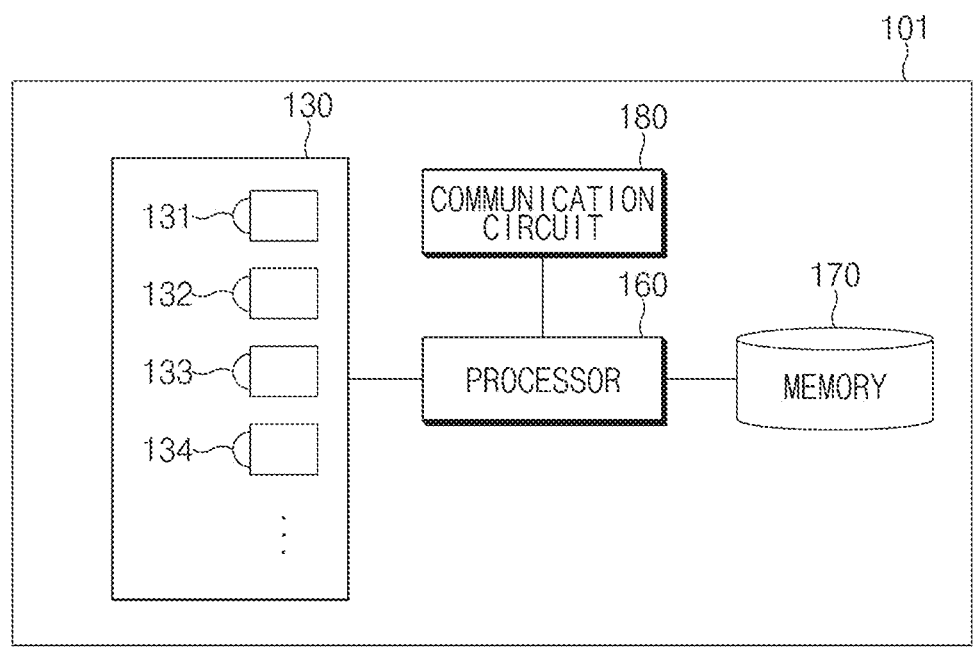
FIG. 1 is a block diagram illustrating a configuration of an electronic device according to an embodiment of the disclosure.

The following description with reference to the accompanying drawings is provided to assist in a comprehensive understanding of the various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

In the disclosure disclosed herein, the expressions "have", "may have", "include" and "comprise", or "may include" and "may comprise" used herein indicate existence of corresponding features (for example, elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for", "having the capacity to", "designed to", "adapted to", "made to", or "capable of". The term "configured to (or set to)" must not mean only "specifically designed to" in hardware. Instead, the expression "a device configured to" may mean that the device is "capable of" operating together with another device or other components. Central processing unit (CPU), for example, a "processor configured to (or set to) perform A, B, and C" may mean a dedicated processor (for example, an embedded processor) for performing a corresponding operation or a generic-purpose processor (for example, a CPU or an application processor) which may perform corresponding operations by executing one or more software programs which are stored in a memory device.

Terms used in this specification are used to describe specified embodiments of the disclosure and are not intended to limit the scope of the disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the disclosure. In some cases, even if terms are terms which are defined in the specification, they may not be interpreted to exclude embodiments of the disclosure.

An electronic device according to various embodiments of the disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), moving picture experts group (MPEG-1 or MPEG-2) audio layer 3 (MP3) players, mobile medical devices, cameras, and wearable devices. According to various embodiments of the disclosure, the wearable devices may include accessories (for example, watches, rings, bracelets, ankle bracelets, glasses, contact lenses, or head-mounted devices (HMDs)), cloth-integrated types (for example, electronic clothes), body-attached types (for example, skin pads or tattoos), or implantable types (for example, implantable circuits).

Hereinafter, electronic devices according to an embodiment of the disclosure will be described with reference to the accompanying drawings. The term "user" used herein may refer to a person who uses an electronic device or may refer to a device (for example, an artificial electronic device) that uses an electronic device.

FIG. 1 is a block diagram illustrating a configuration of an electronic device according to an embodiment of the disclosure. FIG. 1 illustrates, but is not limited to, a configuration associated with image processing.

Referring to FIG. 1, an electronic device 101 may include a plurality of cameras (or a plurality of camera modules) 130, a processor 160, a memory 170, and a communication circuitry 180. In an embodiment, the electronic device 101 may further include an external housing, an internal housing, a sensor, a printed circuit board (PCB), a battery, or the like.

The electronic device 101 may be an imaging device (e.g., a digital camera, a camera for virtual reality (VR), or a three-dimensional (3D) camera) which captures a photo or video. The electronic device 101 may be a device (e.g., a server or a desktop PC) which receives and processes image data from the outside. The electronic device 101 may be a mobile device (e.g., a smartphone, a tablet PC, a laptop PC, or the like) which mounts a plurality of cameras.

Each of the plurality of cameras 130 may collect image data. Each of the plurality of cameras 130 may include a lens and an image sensor. Each of the plurality of cameras 130 may collect image data through each of a plurality of image sensors. Each of the plurality of image sensors may convert light incident through a lens into an electrical signal. The converted electrical signal may be transmitted to the processor 160 and may be stored in the memory 170.

The plurality of cameras 130 may be placed at a specified separation distance. The plurality of cameras 130 may collect different image data captured in the same time, depending on a separation distance or an arrangement direction.

According to an embodiment of the disclosure, the plurality of cameras 130 may be arranged to face different directions, respectively. For example, the plurality of cameras 130 may be arranged in a circle to capture images at 360 degrees. The plurality of cameras 130 may maintain a specified arrangement angle (e.g., 180 degrees, 90 degrees, or 45 degrees) (see FIG. 8).

According to another embodiment of the disclosure, the plurality of cameras 130 may be arranged such that at least some of the plurality of cameras 130 face the same direction. For example, the plurality of cameras 130 may include $1^{st}$ to $16^{th}$ cameras arranged in a circle. For example, a $1^{st}$ camera 131 and a $4^{th}$ camera 134 may be arranged to face a first direction. A $3^{rd}$ camera 133 and a $6^{th}$ camera (not shown) may be arranged to face a second direction different from the first direction (see FIG. 9).

The plurality of cameras 130 may be located such that each of the plurality of cameras 130 has an angle of view overlapped with that of an adjacent camera. Image data collected by each of the plurality of cameras 130 may be partially the same or similar to image data collected by an adjacent camera. Overlapped image data may be partially removed in a process of combining images.

The processor 160 may perform a variety of data processing and various arithmetic operations for driving the electronic device 101. The processor 160 may combine image data collected by means of the image sensors of the plurality of cameras 130 to generate an image (hereinafter referred to as "stitching image"), an overlapped portion of which is partially removed. For example, the processor 160 may remove an overlapped image region from image data collected from each image sensor and may perform a stitching task of combining image data depending on a specified line (e.g., a seamline) (hereinafter referred to as "combination line").

For example, when combining first image data collected by a first image sensor (e.g., the first camera 131) and second image data collected by a second image sensor (e.g., the second camera 132), the processor 160 may generate a stitching image which includes the first image data in a first direction (e.g., on the left) about a combination line and includes second image data in a second direction (e.g., on the right) about the combination line.

The processor 160 may recognize an object (an object of interest or a region of interest (ROI)) in which a user has an interest from image data collected by means of the plurality of image sensors. The object may be a person, an animal, a thing, a landmark, or the like. The processor 160 may previously store specified recognition information (e.g., for a face of a person, a range of a color, a location relationship of eyes, a nose, or a mouth, or the like). The processor 160 may extract a location (coordinates) of an object, a type of the object, or the like from image data based on the stored recognition information.

The processor 160 may store depth information for each recognized object. The depth information may be a distance between the object and the electronic device 101 (or a point disposed from the electronic device 101 at a specified distance). The processor 160 may determine a feature point of an object based on a contrast/color value or the like of image data. The processor 160 may extract a distance between a feature point of an object surface and the electronic device 101. The processor 160 may compare a plurality of images including an object and may store depth information for each feature point based on a distance between cameras which capture the images, a distance between the same feature points, or the like.

The processor 160 may perform stitching by a combination line by default settings and may change a location of the combination line when the combination and coordinates of an object are overlapped with each other. The processor 160 may determine to change a location of the combination line, depending on priority information based on a feature of a recognized object, depth information in a changed combination line, or the like. Additional information about changing the location of the combination line may be provided with reference to FIGS. 2 to 9.

The processor 160 may generate the stitched image as a 360-degree stitching image for VR through conversion according to an equirectangular projection. The processor 160 may convert the stitching image into an image in a form such as a regular tetrahedron, a regular dodecahedron, or a regular icosahedron.

The memory 170 may store a variety of information necessary for an operation of the electronic device 101. For example, the memory 170 may store the image data collected by means of the plurality of cameras 130. The memory 170 may store the stitching image generated through the stitching process by the processor 160.

The memory 170 may store instructions necessary for an operation of the processor 160. When the instructions are executed, the processor 160 may perform an operation defined in the instructions.

The communication circuitry 180 may communicate with an external device. For example, the communication circuitry 180 may transmit a stitching image generated through the stitching task to the external device (e.g., a head mounted display (HMD) device). The communication circuitry 180 may receive image data from the external device (e.g., an external camera device). The communication circuitry 180 may provide the received image data to the processor 160 or the memory 170.

FIG. 1 illustrates, but is not limited to, an example in which the electronic device 101 includes the plurality of cameras 130. For example, the electronic device 101 may receive and process image data captured by an external camera device (e.g., an imaging device or a smartphone). The processor 160 may receive $1^{st}$ to $16^{th}$ image data captured by means of the external camera device via the communication circuitry 180. The processor 160 may remove a portion of an overlapped region among the $1^{st}$ to $16^{th}$ image data to generate one stitching image. The processor 160 may determine a location of a combination line depending on priority information based on a feature of a recognized object, depth histogram information, or the like.

Figure 2:
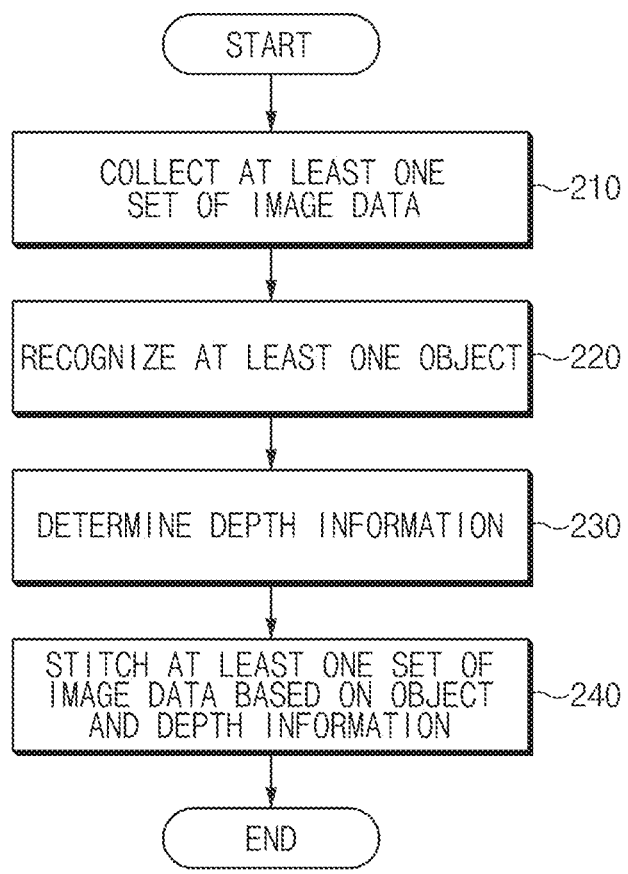
FIG. 2 is a flowchart illustrating an image processing method according to an embodiment of the disclosure.

FIG. 2 is a flowchart illustrating an image processing method according to an embodiment of the disclosure.

Referring to FIG. 2, in operation 210, a processor 160 of FIG. 1 may receive at least one set of image data from pairs of image sensors included in a plurality of cameras 130 of FIG. 1.

For example, the plurality of cameras 130 may include a first camera 131 located toward a first direction and a second camera 132 located toward a second direction. An angle of view of the first camera 131 and an angle of view of the second camera 132 may be partially overlapped with each other. When an input for image capture occurs, a first image sensor included in the first camera 131 and a second image sensor included in the second camera 132 may collect image data, respectively. The processor 160 may receive first image data from the first image sensor and may receive second image data from the second image sensor.

In operation 220, the processor 160 may recognize at least one object form the received first and second image data. The processor 160 may store specified recognition information (e.g., for a face of a person, a range of a pixel color, a form or location relationship of eyes, a nose, or a mouth) in advance. The processor 160 may store a location of an object, a type of the object, related information (e.g., information stored in an address book), or the like from the first and second image data based on the stored recognition information.

In operation 230, the processor 160 may determine depth information of the at least one recognized object. The depth information may be a distance between a feature of the object and an electronic device 101 of FIG. 1. Alternatively, the depth information may be a distance between the feature point of the object and a reference point outside the electronic device 101 (e.g., a point 1 m disposed apart from the electronic device 101).

An angle of view of the first camera 131 and an angle of view of the second camera 132 may be partially overlapped with each other. The processor 160 may compare the first image data with the second image data to determine depth information of an object on a region where the angles of view are overlapped with each other.

In operation 240, the processor 160 may stitch the at least one set of image data (e.g., the first image data and the second image data) using the at least one recognized object and the depth information.

The processor 160 may remove partial image data from the region where the angles of view are overlapped with each other to generate a stitching image. The stitching mage generated by combining the first image data and the second image data may include a combination line (e.g., a seam-line).

When at least a portion of the combination line is overlapped with the recognized object, the processor 160 may move a location of the combination line. For example, the processor 160 may identify depth information on the changed combination line and may determine whether to move the combination line.

When the plurality of objects are recognized and when the overlapped object varies with the movement of the combination line, the processor 160 may determine whether to move the combination line depending on specified priority information. Additional information about the movement of the combination line may be provided with reference to FIGS. 3 and 6.

Figure 3:
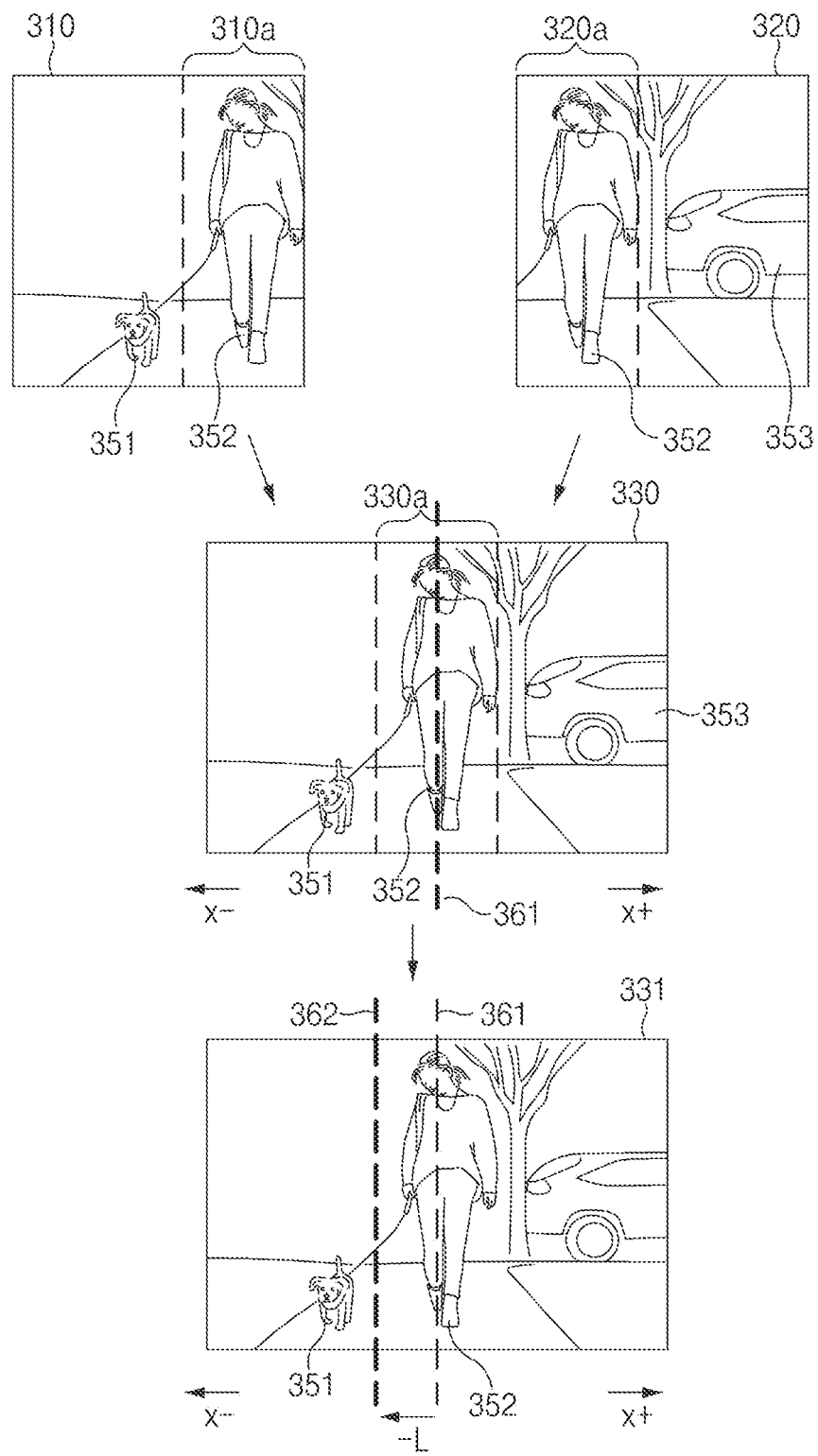
FIG. 3 is a drawing illustrating movement of a combination line according to a location of an object according to an embodiment of the disclosure.

FIG. 3 is a drawing illustrating movement of a combination line according to a location of an object according to an embodiment of the disclosure. FIG. 3 illustrates, but is not limited to, an example of combining images captured by two cameras.

Referring to FIG. 3, a processor 160 of FIG. 1 may collect image data by means of each of a plurality of cameras (or a plurality of image sensors). A first image sensor may collect first image data 310. A second image sensor may collect second image data 320. The first image data 310 and the second image data 320 may be images collected at the same time. The first image data 310 may be an image captured toward a first direction by a first camera 131 of FIG. 1 (the first image sensor). The second image data 320 may be an image captured toward a second direction by a second camera 132 of FIG. 1 (the second image sensor).

The processor 160 may recognize an object included in each image data. The processor 160 may recognize a first object 351 and a second object 352 from the first image data 310. The processor 160 may store location information, type information (e.g., a person, an animal, or a thing), or the like of each of the first object 351 and the second object 352. The processor 160 may recognize the second object 352 an a third object 353 from the second image data 320. The processor 160 may store location information, type information (e.g., a person, an animal, or a thing), or the like of each of the second object 352 and the third object 353.

The first image data 310 and the second image data 320 may include overlapped regions 310a and 320a, respectively. Image values may be the same or similar to each other on a region where an angle of view of the first camera 131 and an angle of view of the second camera 132 are overlapped with each other.

The processor 160 may determine regions with high similarity as the overlapped regions 310a and 320a on the first image data and the second image data 320. Data of the overlapped regions 310a and 320a may be partially excluded in a process of generating a stitching image.

The processor 160 may combine a portion of the first image data 310 and a portion of the second image data 320 to generate a first stitching image 330. The first stitching image 330 may include a combination line 361 in a combination region 330a. With respect to the combination line 361, x− direction may be configured as data of the overlapped region 310a of the first image data 310 and x+ direction may be configured as data of the overlapped region 320a of the second image data 320.

The periphery of the combination line 361 may be a region where two different image data are combined with each other and may be a region where a sense of difference is generated, when a user views the region by means of an HMD device or the like. When the combination line 361 is generated on the second objet 352 in which the user has an interest, the periphery of the combination line 361 may result in an inconvenience to the user. For example, the object in which the user has an interest may be an object close to the electronic device 101 or an object registered by the user.

The processor 160 may determine to move the combination line 361, based on the regions where the recognized objects 351 to 353 are arranged. For example, as shown in FIG. 3, when there is an object (or an object of interest) close to an imaging device on the combination line 361, the processor 160 may change a location of the combination line 361 to generate a second stitching image 331.

The processor 160 may determine whether there is the recognized object on a line (hereinafter referred to as "candidate combination line") 362 moved by a specified distance L. When the candidate combination line 362 and the objects 351 to 353 are not overlapped with each other, the processor 160 may configure image data of the combination region 330a relative to the candidate combination line 362. For example, the candidate combination line 362 is moved in x− direction from the combination line 361 by −L, a region occupied by the first image data 310 may be decreased and a region occupied by the second image data 320 may be increased.

FIG. 3 illustrates, but is not limited to, an example in which the candidate combination line 362 is moved in x+ direction. For example, the candidate combination line 362 may be moved in x− direction.

The processor 160 may determine whether to move a combination line, based on depth information of each of the combination line 361 and the candidate combination line 362. Additional information about the movement of the combination line based on the depth information may be provided with reference to FIGS. 4A and 4B.

Figure 4A:
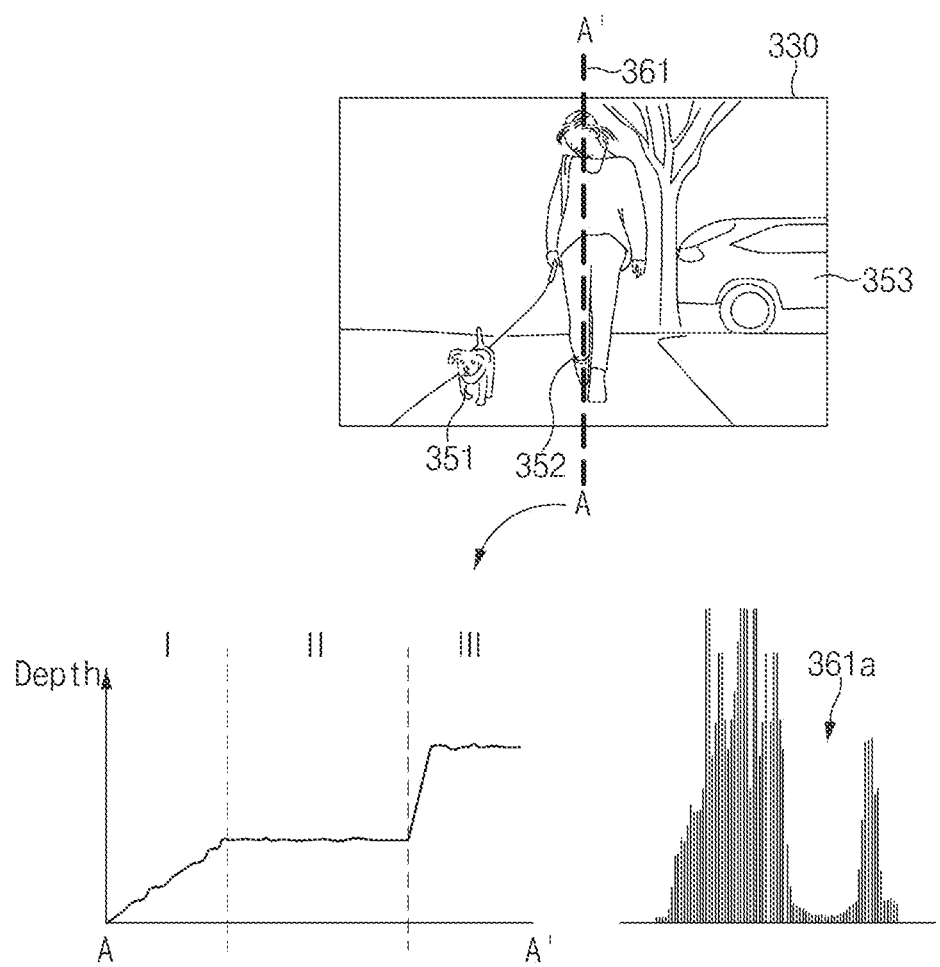
FIGS. 4A and 4B are drawings illustrating movement of a combination line based on depth information according to various embodiments of the disclosure.
Figure 4B:
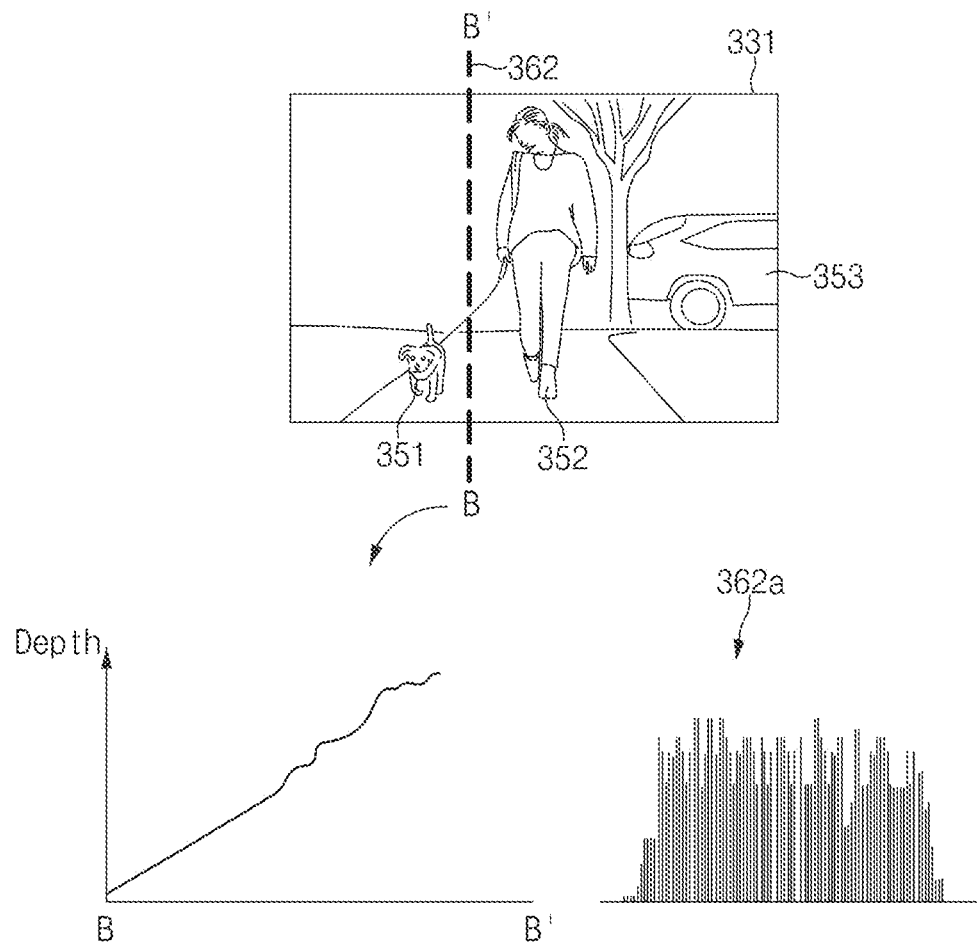

FIGS. 4A and 4B are drawings illustrating movement of a combination line based on depth information according to various embodiments of the disclosure. FIGS. 4A and 4B are illustrative, and embodiments are not limited thereto.

Referring to FIG. 4A, a processor 160 of FIG. 1 may stitch image data collected by means of a plurality of cameras 130 of FIG. 1 (or a plurality of image sensors). The processor 160 may generate a combination line 361 on the center of a combination region by default settings. When the combination line 361 is overlapped with a region where a recognized second object 352 is located, the processor 160 may move the combination line 361 based on depth information.

Seeing a change in depth on the combination line 361, first region I may be a region where there is no recognized object and may be a region which increases close to linear. Second region II may be a region where the second object 352 is recognized and where a change in depth is relatively small. Third region III may be a region where the second object 352 disappears and may be a region where there is a sharp increase in depth. When there is a region, such as third region III, where the change in depth is greater than a reference value, the processor 160 may move the combination line 361.

In a histogram 361a of depth on the combination line 361, the horizontal axis indicates the depth value. For example, for a depth map with 8 bits per pixel, the horizontal axis may have values of 0 to 255. The vertical axis indicates the generation frequency of a depth value (e.g., the number of pixels). As the second object 352 is located on the combination line 361, the number of pixels arranged in a specific interval may be relatively increased, and an interval deviation may be large.

When the number of pixels, each of which has a depth value included in a specific interval, is greater than a specified value (e.g., a threshold), the processor 160 may move the combination line 361.

Referring to FIG. 4B, the processor 160 may identify a change in depth on a candidate combination line 362 spaced apart from the combination line 361 at a specified distance. The candidate combination line 362 may fail to be overlapped with a region where a second object 352 or a third object 353 is located or may be relatively less overlapped with the region where the second object 352 or the third object 353 is located. The processor 160 may identify a change in depth on the candidate combination line 362. A separate object may fail to be overlapped with the candidate combination line 362, and depth on the candidate combination line 362 may increase close to linear. Thus, the change in depth on the candidate combination line 362 may be within a reference value. The processor 160 may stitch first image data and second image data relative to the candidate combination line 362.

In the histogram 362a of depth on the candidate combination line 362, the horizontal axis indicates the depth value. For example, for a depth map with 8 bits per pixels, the horizontal axis may have values of 0 to 255. The vertical axis indicates the generation frequency of a depth value (e.g., the number of pixels). When an object is not located on the candidate combination line 362, in the number of pixels arranged in the entire interval, an interval deviation may be relatively small.

When the number of pixels, each of which has a depth value included in a specific interval, is less than a specified value, the processor 160 may stitch first image data and second image data relative to the candidate combination line 362.

When a region overlaps another object (e.g., a first object 351 or a third object 353) on the candidate combination line 362, the processor 160 may identify depth information on a new combination line. For example, when a region overlaps another object on a candidate combination line of x+ direction, the processor 160 may determine whether there is a region overlapped with another object on a candidate combination line of x− direction.

The processor 160 may move a candidate combination line over a specified number of times to identify depth information and may determine a location of a combination line depending on specified priority information. For example, the processor 160 may determine a location with the smallest change in depth as a location of a combination location. Additional information about the change of the combination line using the priority information may be provided with reference to FIGS. 5A to 5C and FIG. 6.

Figure 5A:
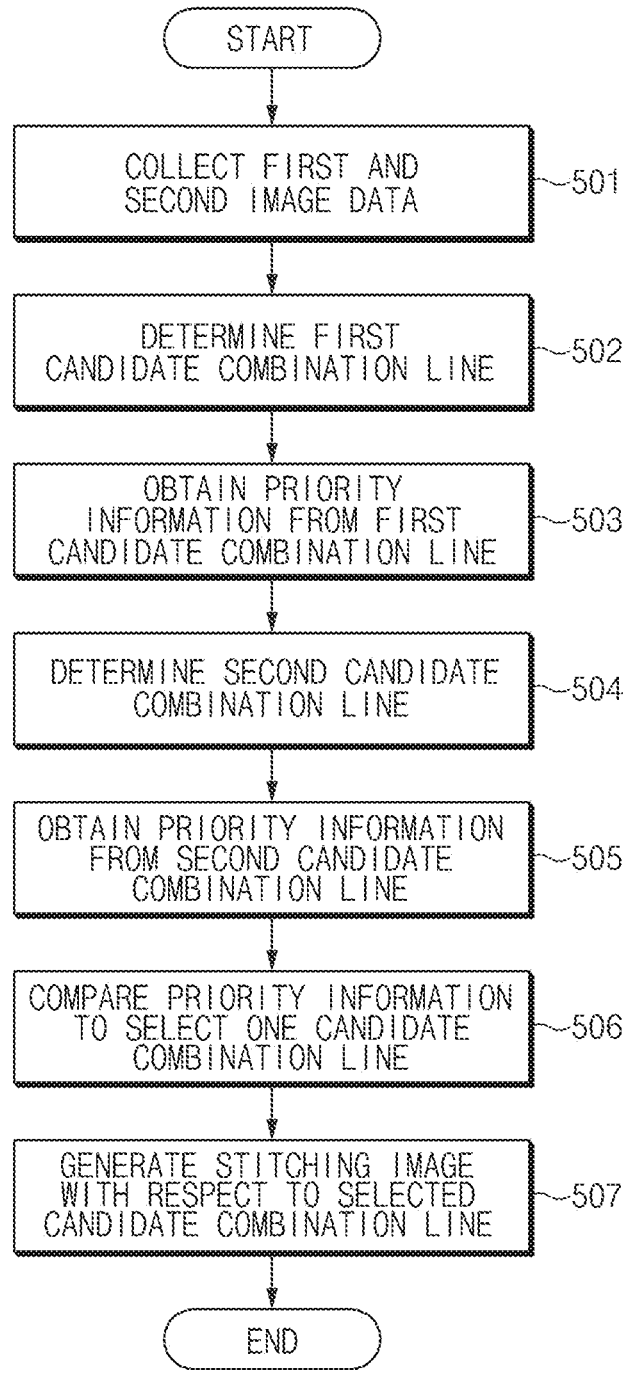
FIG. 5A is a flowchart illustrating a process of performing stitching based on depth information according to an embodiment of the disclosure.

FIG. 5A is a flowchart illustrating a process of performing stitching based on depth information according to an embodiment of the disclosure.

In operation 501, a processor 160 of FIG. 1 may collect first image data and second image data.

In operation 502, the processor 160 may determine a first candidate combination line. The first candidate combination line may be a line configured to perform a task for stitching the first image data and the second image data.

In operation 503, the processor 160 may obtain priority information including information about whether an object is overlapped with the first candidate combination line or depth histogram information.

In operation 504, the processor 160 may determine a second candidate combination line spaced apart from the first candidate combination line at a specified distance (e.g., a pixel distance). The second candidate combination line may be a line which is parallel to the first candidate combination line and maintains a specified pixel distance. Operation 504 may be performed earlier than operation 503 or may be performed concurrently with operation 503.

In operation 505, the processor 160 may obtain priority information including information about whether an object is overlapped with the second candidate combination line or depth histogram information.

There may be a plurality of second candidate combination lines. In this case, the processor 160 may obtain information about whether an object is overlapped with each of the plurality of second candidate combination lines or depth histogram information.

In operation 506, the processor 160 may compare the priority information of the first candidate combination line with the priority information of the at least one second candidate combination line to select one candidate combination line. For example, a candidate combination line which is not overlapped with the object among the first candidate combination line and the at least one second candidate combination line may have a high priority. A candidate combination line with a small interval deviation of a histogram among the first candidate combination line and the second candidate combination line may have a high priority.

In operation 507, the processor 160 may combine the first image data and the second image data with respect to the selected candidate combination line to generate a stitching image.

Figure 5B:
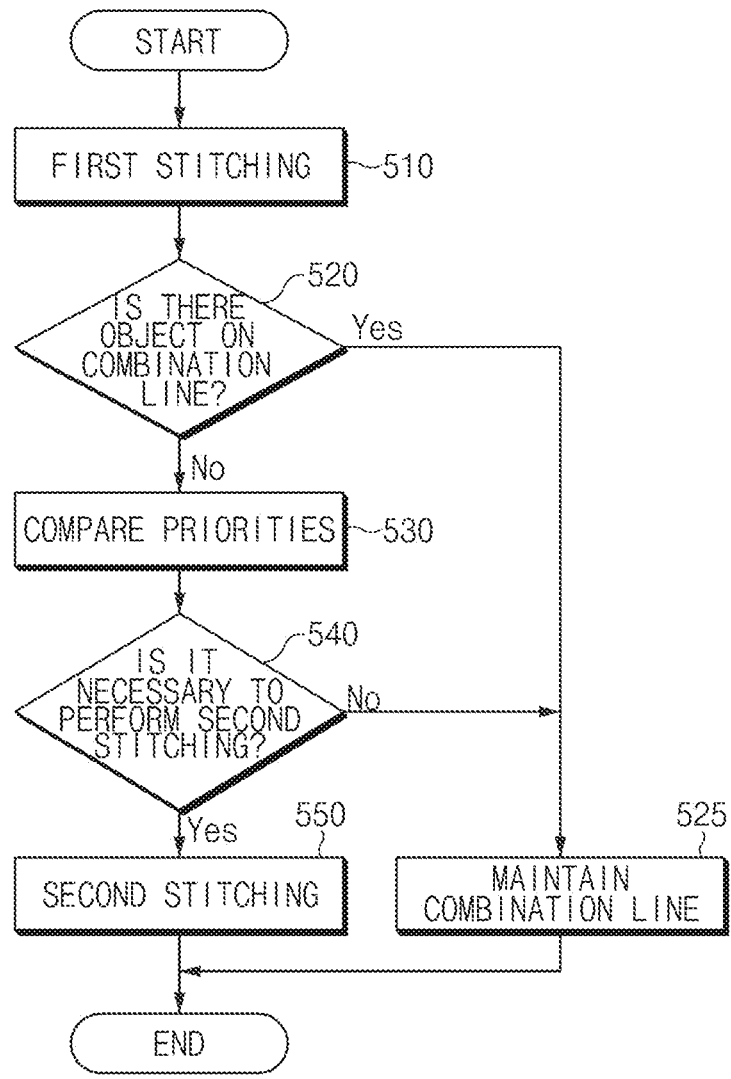
FIG. 5B is a flowchart illustrating a process of performing stitching based on priority information according to an embodiment of the disclosure.

FIG. 5B is a flowchart illustrating a process of performing stitching based on priority information according to embodiment of the disclosure.

Referring to FIG. 5B, in operation 510, a processor 160 of FIG. 1 may perform a first stitching task based on first image data and second image data. For example, the processor 160 may generate a first stitching image which has a combination line by default setting (hereinafter referred to as "default combination line") on the center of a combination region, through the first stitching task.

In operation 520, the processor 160 may determine whether an object is on the default combination line. The processor 160 may compare coordinates of the recognized object with coordinates of the default combination line to determine whether an object is on the default combination line.

In operation 525, when no object is on the default combination line, the processor 160 may maintain the default combination line.

When an object is on the default combination line, in operation 530, the processor 160 may compare a priority of the default combination with a priority of a candidate combination line. Information about priorities may be previously stored in a manufacturing stage or may be stored through a file provided from a manufacturer or an application manager. Alternatively, the information about the priorities may be stored by a user input of an electronic device 101 of FIG. 1. When the electronic device 101 includes a display, it may display a user interface for inputting priority information.

That the priority of the candidate combination line is high may refer to performing stitching with respect to the candidate combination line. For example, performing stitching with respect to the candidate combination line with the high priority may mean that there is no object on a combination line or that there is a low probability that a sense of difference will be given to a user.

A candidate combination line, at least a portion of which overlaps an object which is focused or has a large screen occupation ratio among the recognized objects, may have a low priority. On the other hand, a candidate combination line overlapped with an object which is out of focus, an object with a small screen occupation ratio, a stopped object, or the like may have a high priority.

A candidate combination line with a large change in depth information may have a low priority. On the other hand, a candidate combination line with a small change in depth information may have a high priority.

A priority may vary with a type of the recognized object. A candidate combination line overlapped with an object, such as a person or a face of the person, may have a low priority. On the other hand, a candidate combination line overlapped with an object, such as an animal, a plant, or a thing, may have a high priority.

A combination line overlapped with a database of an address book of the user or an object matched with an image of a gallery may have a low priority. On the other hand, a combination line overlapped with an object which is not matched with a database stored in the electronic device 101 may have a high priority.

A combination line overlapped with an object which is not recognized by an adjacent camera may have a low priority. On the other hand, an object located on a region where an angle of view is overlapped with that of the adjacent camera (an object located on an overlapped region) may have a high priority.

In operation 540, the processor 160 may determine whether it is necessary to perform a second stitching task, as a result of comparing the priorities. When the default combination line has the highest priority as a result of comparing the priorities, in operation 525, the processor 160 may maintain the default combination line on the first stitching image.

When there is a candidate combination line which has a priority higher than the priority of the default combination line, in operation 550, the processor 160 may change a combination line to perform second stitching.

The processor 160 may compare priorities of a plurality of candidate combination lines and may perform the second stitching task using a combination line with the highest priority.

Figure 5C:
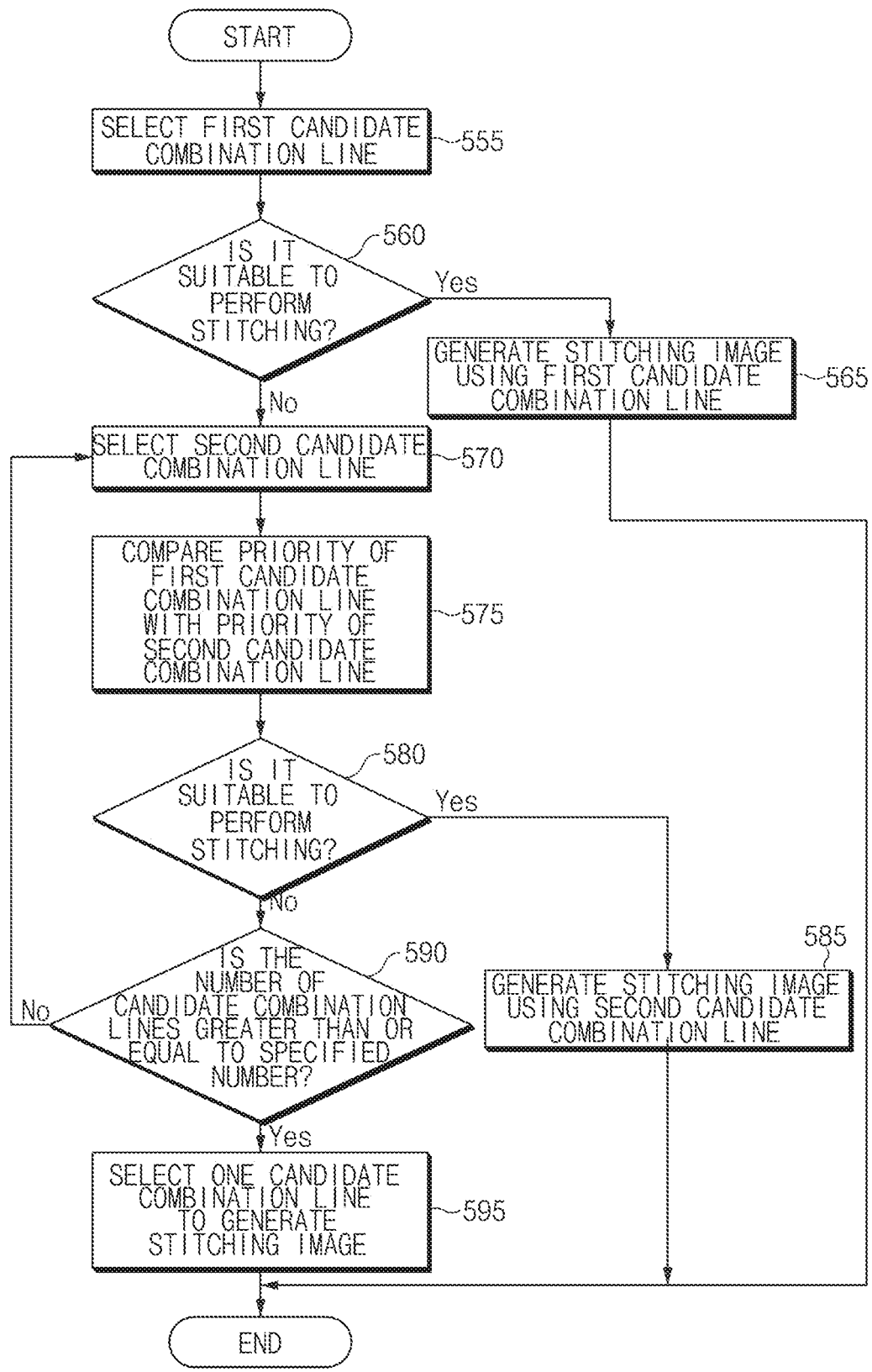
FIG. 5C is a flowchart illustrating a process of performing stitching using candidate combination lines according to an embodiment of the disclosure.

FIG. 5C is a flowchart illustrating a process of performing stitching using candidate combination lines according to an embodiment of the disclosure.

Referring to FIG. 5C, in operation 555, a processor 160 of FIG. 1 may select a first candidate combination line. The first candidate combination line may be a line configured to perform a task of stitching first image data and second image data.

In operation 560, the processor 160 may determine whether it is suitable for the first candidate combination line to perform stitching. According to an embodiment of the disclosure, when an object of interest is overlapped with the first candidate combination line, the processor 160 may determine that it is not suitable for the first candidate combination line to perform the stitching. According to another embodiment of the disclosure, when an interval deviation of a histogram of depth information on the first candidate combination line is less than a specified value, the processor 160 may determine that it is suitable for the first candidate combination line to perform the stitching.

When it is suitable for the first candidate combination line to perform the stitching, in operation 565, the processor 160 may select the first candidate combination line as a combination line for a stitching task and may generate a stitching image using the selected combination line.

When it is not suitable for the first candidate combination line to perform the stitching, in operation 570, the processor 160 may select a second candidate combination line. The second candidate combination line may be a line spaced apart from the first candidate combination line at a specified distance.

In operation 575, the processor 160 may compare priority information of the first candidate combination line with priority information of the second candidate combination line to select one candidate combination line. For example, a candidate combination line which is not overlapped with the object of interest between the first candidate combination line and the second candidate combination line may have a high priority. A candidate combination line with a small interval deviation of a histogram between the first candidate combination line and the second candidate combination line may have a high priority.

In operation 580, the processor 160 may determine whether it is suitable for the second candidate combination line to perform stitching.

When it is suitable for the second candidate combination line to perform the stitching, in operation 585, the processor 160 may select the second candidate combination line as a combination line for a stitching task and may generate a stitching image using the selected combination line.

When it is not suitable for the second candidate combination line to perform the stitching, in operation 590, the processor 160 may determine whether the number of candidate combination lines is greater than or equal to a specified number.

When the number of candidate combination lines is greater than or equal to the specified number, in operation 595, the processor 160 may select one candidate combination line to generate a stitching image. For example, the processor 160 may select a first candidate combination line or one of a plurality of second candidate combination lines as a candidate combination line for generating a stitching image and may generate the stitching image using the selected candidate combination line.

Figure 6:
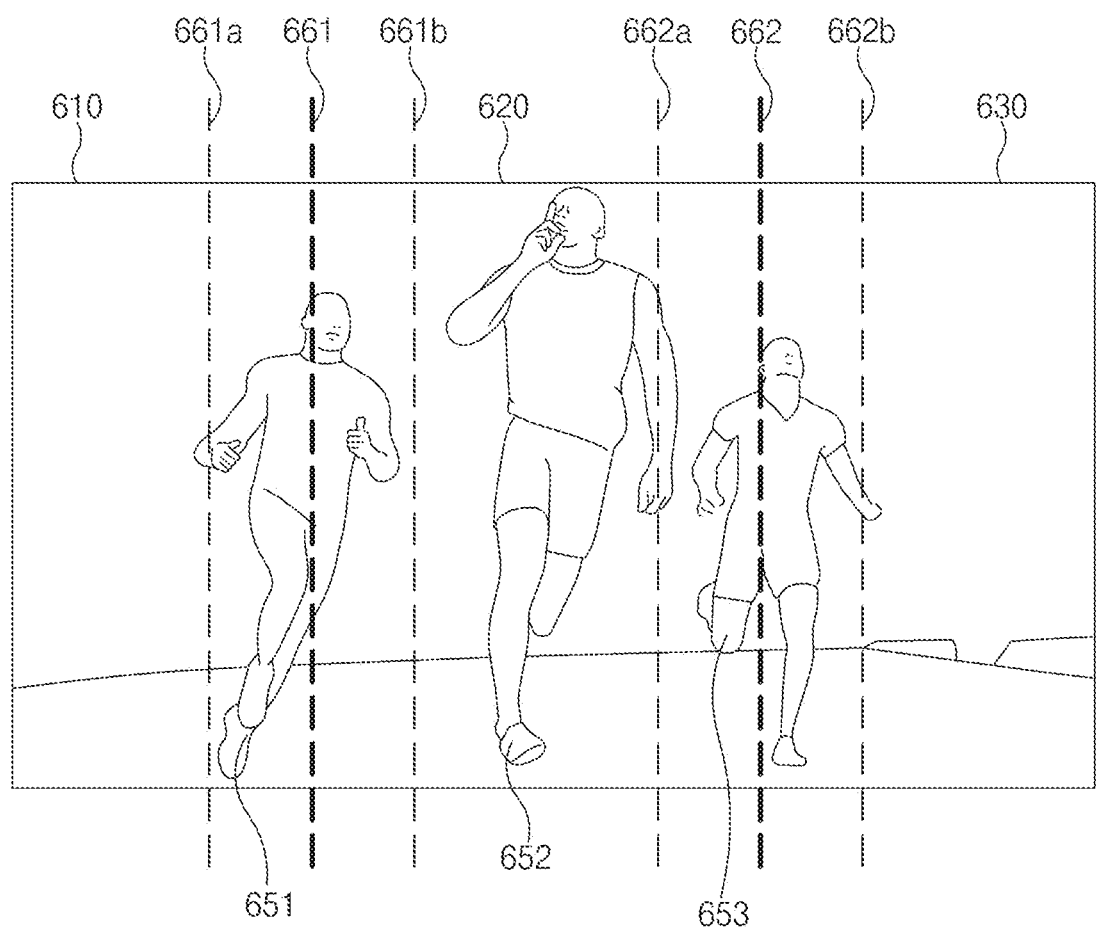
FIG. 6 is a drawing illustrating priorities of combination lines according to an embodiment of the disclosure.

FIG. 6 is a drawing illustrating priorities of combination lines according to an embodiment of the disclosure. FIG. 6 illustrates, but is not limited to, an example in which first to third image data 610 to 630 collected by three cameras are combined.

Referring to FIG. 6, a processor 160 of FIG. 1 may combine the first to third image data 610 to 630 collected by first to third cameras to generate a stitching image. The stitching image may include a first default combination line 661 and a second default combination line 662. For example, the first default combination line 661 may be formed on the center of image data overlapped on the first image data 610 and the second image data 620. The second default combination line 662 may be formed on the center of image data overlapped on the second image data 620 and the third image data 630.

The processor 160 may recognize first to third objects 651 to 653 from the first to third image data 610 to 630. The processor 160 may store information about a location (coordinates) of the recognized object, a type (e.g., a person) of the object, or the like. The processor 160 may extract and store depth information of each of the recognized first to third objects 651 to 653.

A combination line overlapped with an object which is focused on the screen or an object with the largest arrangement region may have a low priority. For example, when the second object 652 is the object which is focused or the object with the largest arrangement region, a candidate combination line 662a overlapped with the second object 652 may have the lowest priority.

When all of a plurality of combination lines overlap the same object, the processor 160 may determine a combination to perform stitching based on depth information on each of the plurality of combination lines. For example, when both of the second default combination line 662 and a candidate combination line 662b are overlapped with the third object 653, the processor 160 may determine a combination line to perform stitching based on depth information of each of the second default combination line 662 and the candidate combination line 662b. The second default combination line 662 may be longer in an interval overlapped with the third object 653 than the candidate combination line 662b. Thus, a change in the depth of the second default combination line 662 may be larger than that in the depth of the candidate combination line 662b. The processor 160 may determine the candidate combination line 662b as a combination line to perform the final stitching. In another example, when both the second default combination line 662 and the candidate combination line 662b are overlapped with the third object 653, the processor 160 may identify a relation with the third object 653 on each of the second default combination line 662 and the candidate combination line 662b. When the second default combination line 662 is close to a face of the third object 653 and when the candidate combination line 662b is close to a hand of the third object 653, the processor 160 may determine the candidate combination line 662b as a combination line to perform the final stitching. The processor 160 may perform a second stitching task relative to the determined combination line.

The processor 160 may identify a priority for each combination line and may determine a combination line to perform stitching.

For example, the first default combination line 661 may be overlapped with the first object 651 at a considerable portion. The first default combination line 661 may have the lowest priority. The first candidate combination line 661a may have an interval which is partially overlapped with the first object 651. The first default combination line 661 may have a relatively low priority.

The second candidate combination line 661b may not overlap the first to third objects 651 to 653. The second candidate combination line 661b may have a relatively high priority. The processor 160 may determine the second candidate combination line 661b as a combination line to perform stitching. The processor 160 may perform the second stitching task relative to the second candidate combination line 661b.

The second default combination line 662 may be overlapped with the third object 653 at a considerable portion. The first default combination line 661 may have a relatively low priority. The first candidate combination line 662a may be partially overlapped with the second object 652 which is a focused object (e.g., an object with the highest depth or the closest object). The first candidate combination line 662a may have the lowest priority.

The second candidate combination line 662b may be partially overlapped with the third object 653. The second candidate combination line 662b is less than a second default combination line 662 in an interval overlapped with the third object 653 to have a relatively small depth change ratio. The processor 160 may determine the second candidate combination line 662b as a combination line to perform stitching. The processor 160 may perform the second stitching task relative to the second candidate combination line 662b.

Figure 7:
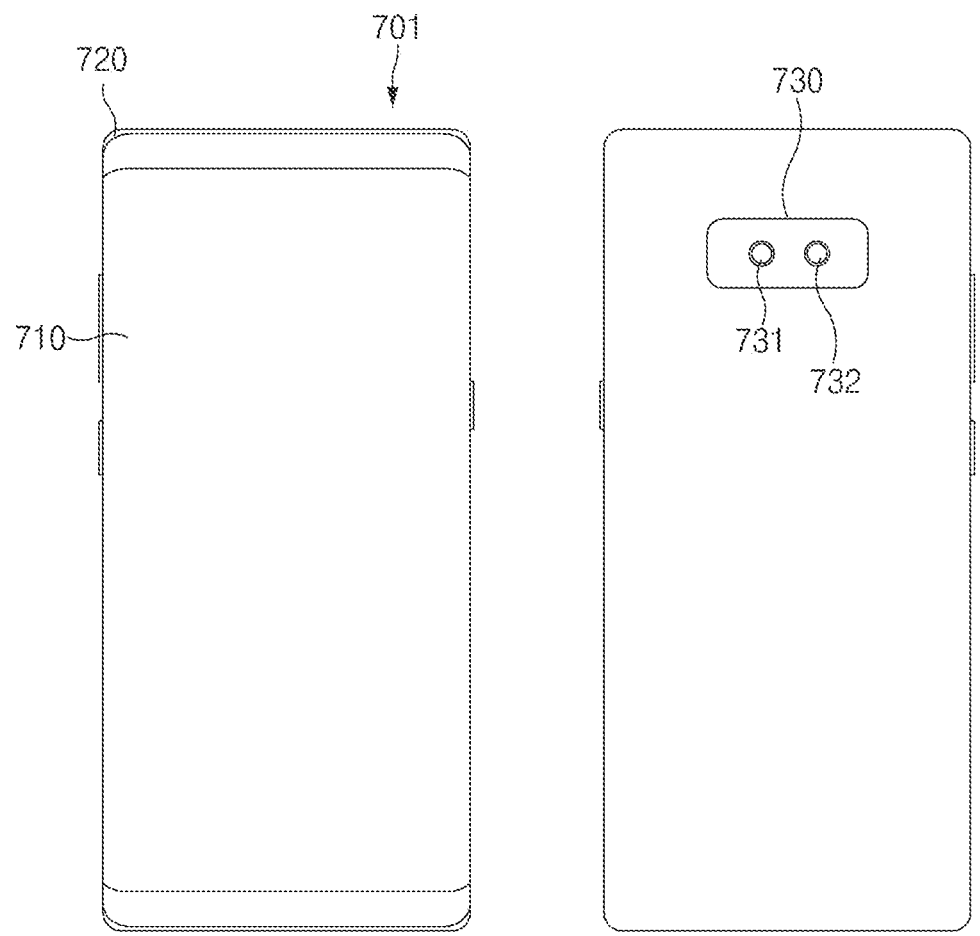
FIG. 7 is a drawing illustrating stitching of images in a dual camera facing the same direction, according to an embodiment of the disclosure.
Figure 7:
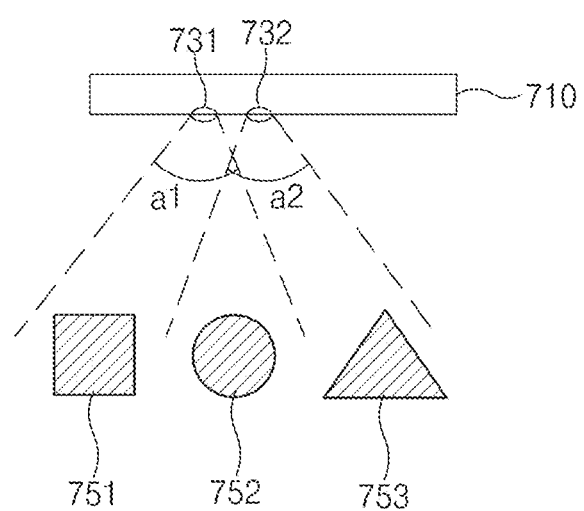

FIG. 7 is a drawing illustrating stitching of images in a dual camera facing the same direction, according to an embodiment of the disclosure.

Referring to FIG. 7, an electronic device 701 may include a display 710 and a housing 720.

The display 710 may output content such as a text or an image. The display 710 may output a screen where an application run on the electronic device 701 is executed. For example, the display 710 may display a live view image based on image data collected by means of a dual camera 730. A user may capture a photo or video while identifying the live view image.

The housing (or a body part) 720 may fix the display 710 and may protect various components therein. The housing 720 may include a button, a sensor window, or a speaker, the dual camera 730, and the like outside the housing 720.

The housing (or the body part) 720 may include various components, such as a communication circuitry, a processor, a memory, a printed circuit board (PCB), or a battery, necessary to drive the electronic device 701, therein.

The dual camera 730 may include a first camera 731 and a second camera 732 which are spaced apart from each other at a specified separation distance. Each of the first camera 731 and the second camera 732 may collect image data.

The first camera 731 may have a first angle a1 of view. When first to third objects 751 to 753 are captured, the first object 751 and the second object 752 may be included in the first angle a1 of view. When the first camera 731 collects image data depending on an image capture input, the first image data may include the first object 751 and the second object 752.

The second camera 732 may have a second angle a2 of view. When the first to third objects 751 to 753 are captured, the second object 752 and the third object 753 may be included in the second angle a2 of view. When the second camera 732 collects image data depending on an image capture input, the second image data may include the second object 752 and the third object 753.

A processor of the electronic device 701 may combine the first image data and the second image data to generate a stitching image. When a combination line is generated on the second object 752 which is common to the first angle a1 of view and the second angle a2 of view, the processor may move the combination line.

The processor may determine a combination line to perform stitching based on depth information of the candidate combination line moved in a specified direction and may perform a second stitching task using the determined combination line.

The processor may determine a combination line with the highest priority among a plurality of candidate combinations and a default combination line as a combination line to perform stitching and may perform the second stitching task using the determined combination line.

Figure 8:
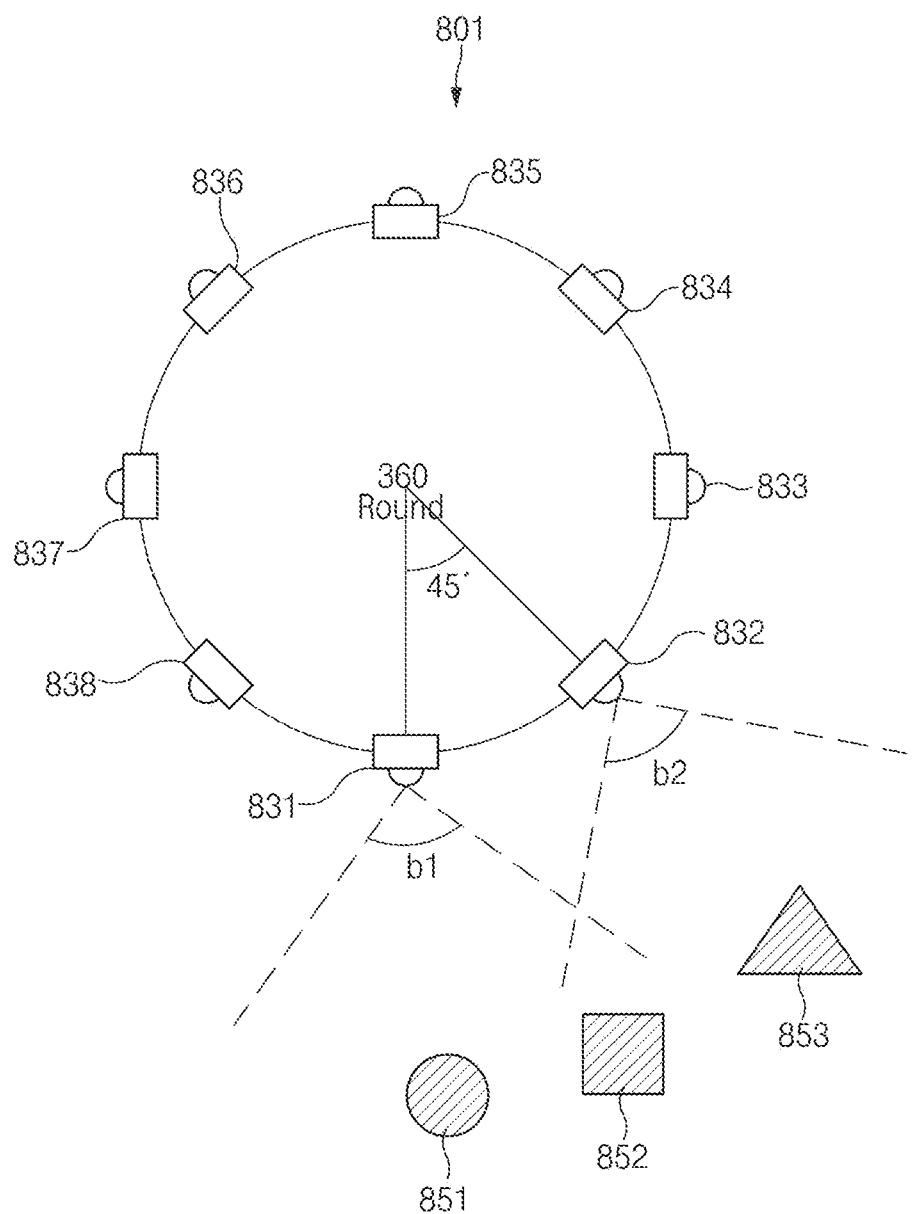
FIG. 8 is a drawing illustrating an electronic device including a plurality of cameras, each of which faces a different direction, according to an embodiment of the disclosure.

FIG. 8 is a drawing illustrating an electronic device including a plurality of cameras, each of which faces a different direction, according to an embodiment of the disclosure. FIG. 8 illustrates, but is not limited to, an example in which $1^{st}$ to $8^{th}$ cameras 831 to 838 are included.

Referring to FIG. 8, an electronic device 801 may include the $1^{st}$ to $8^{th}$ cameras 831 to 838.

The $1^{st}$ to $8^{th}$ cameras 831 to 838 may be arranged to face different directions. For example camera lenses may be arranged in a circle to face a direction outside the electronic device 801. Each of the $1^{st}$ to $8^{th}$ cameras 831 to 838 may be located to form a specified arrangement angle (e.g., 45 angles) with an adjacent camera. For example, the first camera 831 may be located to face a first direction, and the second camera 832 may be located to face a second direction forming an arrangement angle of 45 degrees with the first direction.

Each of the $1^{st}$ to $8^{th}$ cameras 831 to 838 may have an angle of view which is partially overlapped with that of an adjacent camera. For example, an angle b1 of view of the first camera 831 may be partially overlapped with an angle b2 of view of the second camera 832. The $1^{st}$ to $8^{th}$ cameras 831 to 838 may capture a 360-degree image around the electronic device 801 in an overlapped manner.

When first to third objects 851 to 853 are captured, the first object 851 and the second object 852 may be included in the first angle b1 of view. When the first camera 831 collects image data depending on an image capture input, the first image data may include the first object 851 and the second object 852. The second object 852 and the third object 853 may be included in a second angle b2 of view. When the second camera 832 collects image data depending on an image capture input, the second image data may include the second object 852 and the third object 853.

Each of the $1^{st}$ to $8^{th}$ cameras 831 to 838 may have an angle of view of a range wider than an arrangement angle between cameras. For example, when an arrangement angle between adjacent cameras is 45 degrees, image data collected by each of the $1^{st}$ to $8^{th}$ cameras 831 to 838 may have an angle of view in the range of 50 degrees.

A processor (e.g., a processor 160 of FIG. 1) of the electronic device 801 may combine first image and second image data to generate a stitching image. When a combination line is generated on the second object 852 which is common to the first angle b1 of view and the second angle b2 of view, the processor may move the combination line.

The processor may determine a combination line to perform stitching based on depth information of the candidate combination line moved in a specified direction and may perform a second stitching task using the determined combination line.

The processor may determine a combination line with the highest priority among a plurality of candidate combinations and a default combination line as a combination line to perform stitching and may perform the second stitching task using the determined combination line.

FIG. 8 illustrates, but is not limited to, an example in which the arrangement angle between cameras is 45 degrees. For example, an apparatus may be implemented with two cameras forming an arrangement angle of 180 degrees or four cameras forming an arrangement angle of 90 degrees, by means of a fisheye lens or the like.

Figure 9:
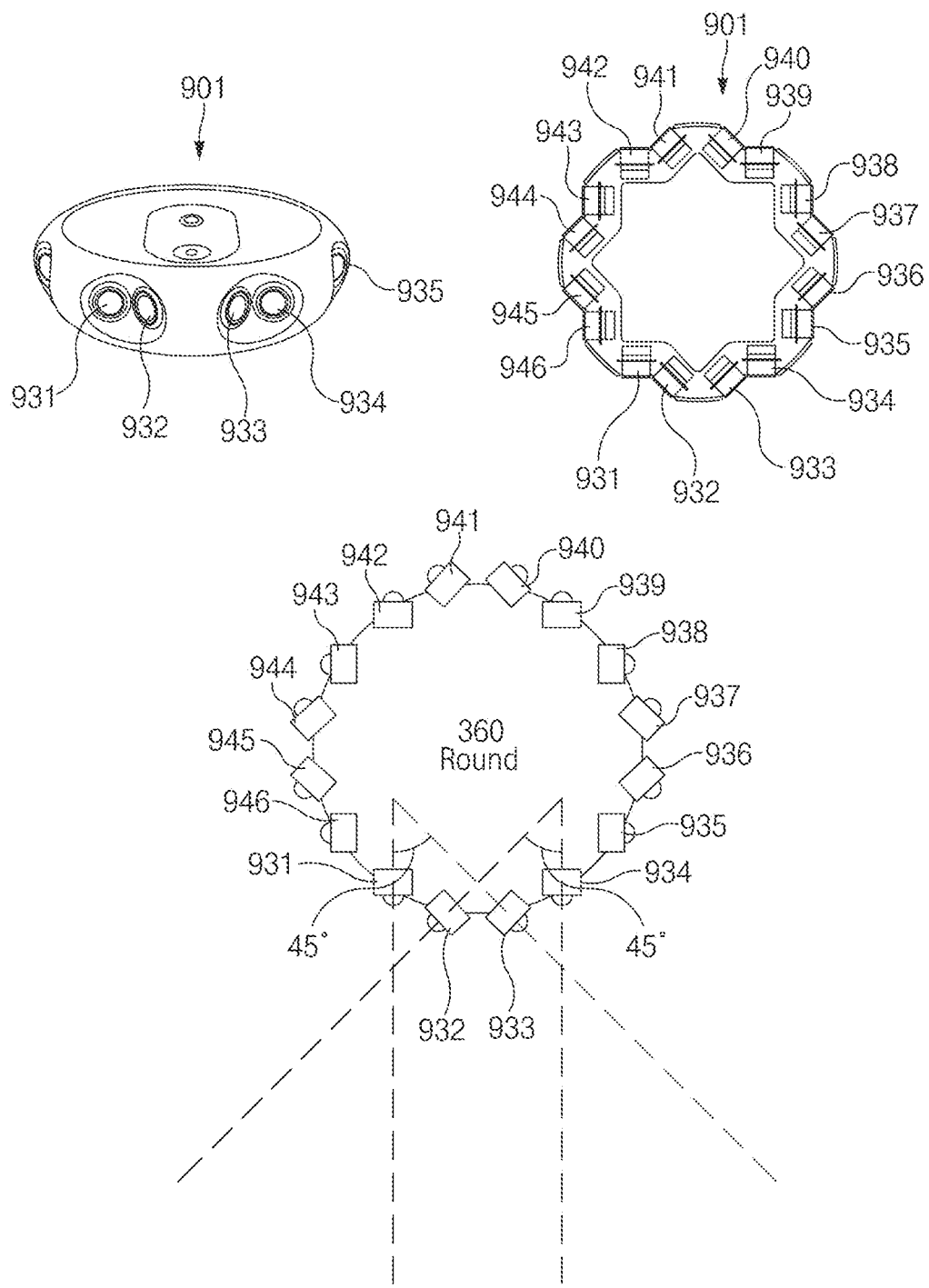
FIG. 9 is a drawing illustrating an electronic device including a plurality of cameras, at least two cameras of which face the same direction, according to an embodiment of the disclosure.

FIG. 9 is a drawing illustrating an electronic device including a plurality of cameras, at least two cameras of which face the same direction, according to an embodiment of the disclosure. FIG. 9 illustrates, but is not limited to, an example in which $1^{st}$t to $16^{th}$ cameras 931 to 946 are included.

Referring to FIG. 9, an electronic device 901 may include the Pt to $16^{th}$ cameras 931 to 946. In addition, the electronic device 901 may include a separate camera which captures a direction (e.g., an upward direction or a downward direction) different from the $1^{st}$ to $16^{th}$ cameras 931 to 946.

The $1^{st}$ to $16^{th}$ cameras 931 to 946 may be arranged in a circle to face an outer direction. At least two of the $1^{st}$ to $16^{th}$ cameras 931 to 946 may be arranged to face the same direction.

The $1^{st}$ camera 931 may have an arrangement direction different from the adjacent $2^{nd}$ camera 932 or $3^{rd}$ camera 933. The $1^{st}$ camera 931 may form, for example, an arrangement angle of 45 degrees with the $3^{rd}$ camera 933.

The $1^{st}$ camera 931 may be located to face the same direction as the $4^{th}$ camera 934. The $1^{st}$ camera 931 and the $4^{th}$ camera 934 may be arranged to maintain a separation distance (e.g., about 10 cm) corresponding to a distance between two eyes of a user.

Similarly, the $3^{rd}$ camera 933 may have an arrangement direction different from the adjacent $4^{th}$ camera 934 or $5^{th}$ camera 935. The $3^{rd}$ camera 933 may form, for example, an arrangement angle of 45 degrees with the $5^{th}$ camera 933.

The $3^{rd}$ camera 933 may be located to face the same direction as the $6^{th}$ camera 934. The $3^{rd}$ camera 933 and the $6^{th}$ camera 936 may be arranged to maintain a separation distance (e.g., about 10 cm) corresponding to a distance between the two eyes of the user.

Each of the $1^{st}$ to $16^{th}$ cameras 931 to 946 may have an angle of view which is partially overlapped with that of an adjacent camera. For example, the angle of view of the $1^{st}$ camera 931 may be partially overlapped with an angle of view of the 2nd camera 932 and the $3^{rd}$ camera 933. The Pt to $16^{th}$ cameras 931 to 946 may capture a 360-degree image around the electronic device 901 in a partially overlapped manner.

A processor of the electronic device 901 may stitch image data of cameras, which are not adjacent to each other, to generate two stitching images. For example, the processor may combine image data collected by the $1^{st}$ camera 931, the 3rd camera 933, the 5th camera 935, the 7th camera 937, the 9th camera 939, the 11th camera 941, the 13th camera 943, and the 15th camera 945 to generate a first stitching image. The processor may combine image data collected by the 2nd camera 932, the 4th camera 934, the 6th camera 936, the 8th camera 938, the 10th camera 940, the 12th camera 942, the 14th camera 944, and the 16th camera 946 to generate a second stitching image.

The processor may perform a task for moving a combination line based on object and depth information, with respect to each of the first stitching image and the second stitching image.

A process of moving the combination line on the first stitching image may be performed independently of a process of moving the combination on the second stitching image.

When the user views the first stitching image and the second stitching image using an HMD device, the HMD device may output the first stitching image on a left eye (or a right eye) of the user and may output the second stitching image on the right eye (or the left eye).

Figure 10:
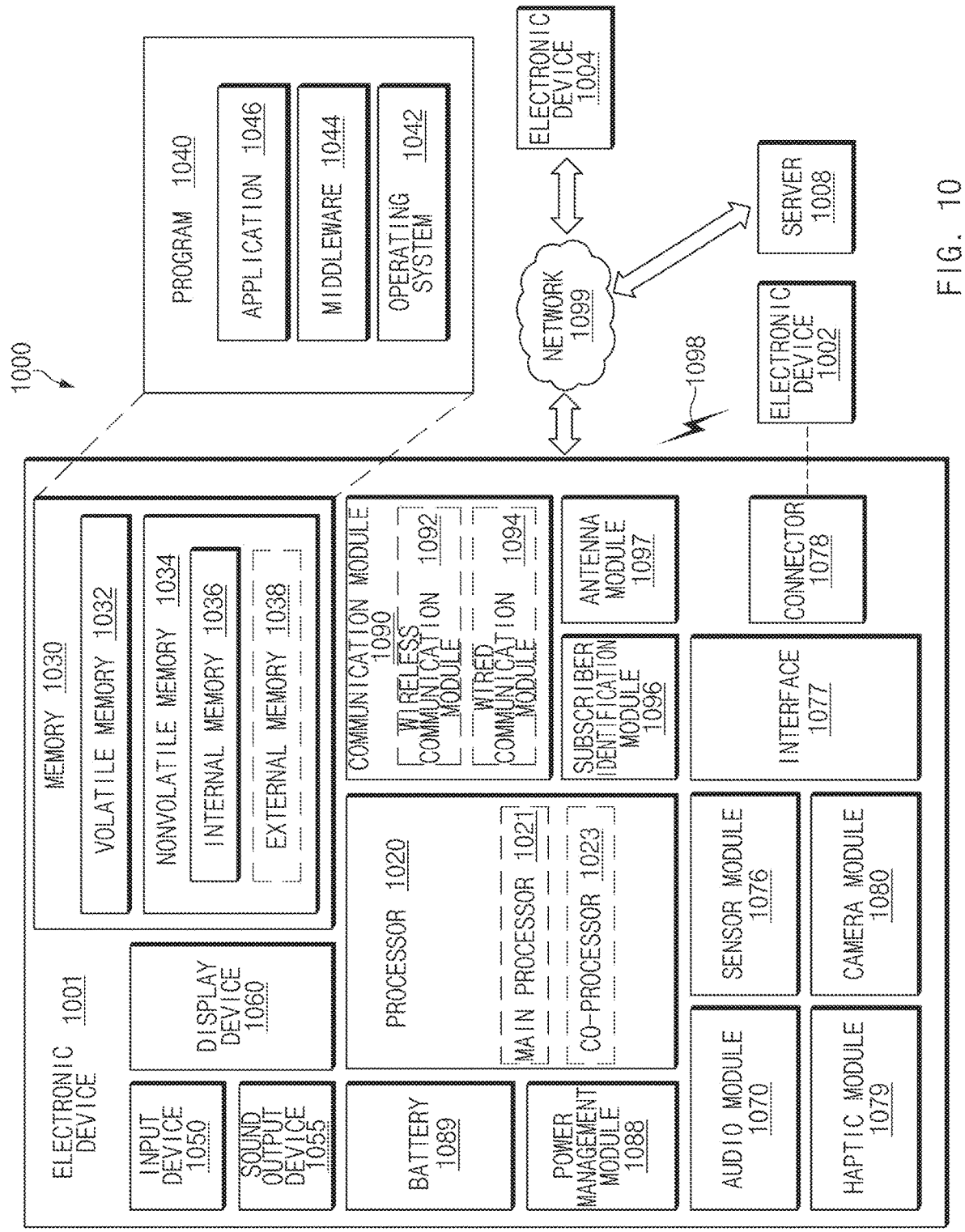
FIG. 10 is a block diagram illustrating an electronic device in a network environment according to an embodiment of the disclosure.

FIG. 10 is a block diagram of an electronic device 1001 in a network environment 1000, according to an embodiment of the disclosure.

Referring to FIG. 10, the electronic device 1001 in the network environment 1000 may communicate with an electronic device 1002 over a first network 1098 (e.g., a short range wireless communication network) or may communicate with an electronic device 1004 or a server 1008 over a second network 1099 (e.g., a long distance wireless communication network). According to an embodiment, the electronic device 1001 may communicate with the electronic device 1004 through the server 1008. According to an embodiment, the electronic device 1001 may include a processor 1020, a memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module 1096, or an antenna module 1097. In any embodiment, at least one (e.g., the display device 1060 or the camera module 1080) of the components may be omitted from the electronic device 1001, or one or more other components may be further included in the electronic device 1001. In any embodiment, some of the components may be implemented with a single integrated circuit. For example, the sensor module 1076 (e.g., a fingerprint sensor, an iris sensor, or an illumination sensor) may be embedded in the display device 1060 (e.g., a display).

The processor 1020 may execute, for example, software (e.g., a program 1040) to control at least one other component (e.g., a hardware or software component) of the electronic device 1001 connected to the processor 1020, and may perform various data processing or operations. According to an embodiment, as at least a part of the data processing or operations, the processor 1020 may load a command or data received from any other component (e.g., the sensor module 1076 or the communication module 1090) to a volatile memory 1032, may process the command or data stored in the volatile memory 1032, and may store processed data in a nonvolatile memory 1034. According to an embodiment, the processor 1020 may include a main processor 1021 (e.g., a central processing unit or an application processor) and a coprocessor 1023 (e.g., a graphic processing device, an image signal processor, a sensor hub processor, or a communication processor), which may be operated independently of or together with the main processor 1021. Additionally or alternatively, the coprocessor 1023 may be configured to use lower power than the main processor 1021 or to be specialized for a specified function. The coprocessor 1023 may be implemented separately from the main processor 1021 or may be implemented as a part of the main processor 1021.

The coprocessor 1023 may control at least a part of a function or states associated with at least one component (e.g., the display device 1060, the sensor module 1076, or the communication module 1090) of the electronic device 1001, for example, instead of the main processor 1021 while the main processor 1021 is in an inactive (e.g., sleep) state and together with the main processor 1021 while the main processor 1021 is in an active (e.g., an application execution) state. According to an embodiment, the coprocessor 1023 (e.g., an image signal processor or a communication processor) may be implemented as a part of any other component (e.g., the camera module 1080 or the communication module 1090) which is functionally (or operatively) associated with the coprocessor 1023.

The memory 1030 may store various data which are used by at least one component (e.g., the processor 1020 or the sensor module 1076) of the electronic device 1001. The data may include, for example, software (e.g., the program 1040), or input data or output data associated with a command of the software. The memory 1030 may include the volatile memory 1032 or the nonvolatile memory 1034. The nonvolatile memory 1034 may include an internal memory 1036 and an external memory 1038.

The program 1040 may be stored in the memory 1030 as software, and may include, for example, an operating system 1042, a middleware 1044, or an application 1046.

The input device 1050 may receive a commands or data which will be used by a component (e.g., the processor 1020) of the electronic device 1001, from the outside (e.g., a user) of the electronic device 1001. The input device 1050 may include, for example, a microphone, a mouse, or a keyboard.

The sound output device 1055 may output a sound signal to the outside of the electronic device 1001. The sound output device 1055 may include, for example, a speaker or a receiver. The speaker may be used for a general purpose such as multimedia play or recording play, and the receiver may be used to receive an incoming call. According to an embodiment, the receiver may be implemented separately from the speaker or may be implemented as a part of the speaker.

The display device 1060 may visually provide information to the outside (e.g., the user) of the electronic device 1001. The display device 1060 may include, for example, a display, a hologram device, or a control circuit for controlling a projector and a corresponding device. According to an embodiment, the display device 1060 may include a touch circuitry configured to sense a touch, or a sensor circuitry (e.g., a pressure sensor) configured to measure the strength of force generated by the touch.

The audio module 1070 may convert sound to an electrical signal, or reversely, may convert an electrical signal to sound. According to an embodiment, the audio module 1070 may obtain sound through the input device 1050, or may output sound through the sound output device 1055, or through an external electronic device (e.g., the electronic device 1002) (e.g., a speaker or a headphone) directly or wirelessly connected with the electronic device 1001.

The sensor module 1076 may sense an operation state (e.g., power or a temperature) of the electronic device 1001 or an external environment state (e.g., a user state), and may generate an electrical signal or a data value corresponding the sensed state. According to an embodiment, the sensor module 1076 may include, for example, a gesture sensor, a grip sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 1077 may support one or more specified protocols that may be used to directly and wirelessly connect the electronic device 1001 with an external electronic device (e.g., the electronic device 1002). According to an embodiment, the interface 1077 may include, for example, a high definition multimedia interface (HDMI), a universal serial bus (USB) interface, a secure digital (SD) card interface, or an audio interface.

A connection terminal 1078 may include a connector that may allow the electronic device 1001 to be physically connected with an external electronic device (e.g., the electronic device 1002). According to an embodiment, the connection terminal 1078 may include, for example, a HDMI connector, a USB connector, a SD card connector, or an audio connector (e.g., a headphone connector).

The haptic module 1079 may convert an electrical signal to a mechanical stimulation (e.g., vibration or movement) or an electrical stimulation which the user may perceive through the sense of touch or the sense of movement. According to an embodiment, the haptic module 1079 may include, for example, a motor, a piezoelectric sensor, or an electrical stimulation device.

The camera module 1080 may photograph a still image and a video. According to an embodiment, the camera module 1080 may include one or more lenses, image sensors, image signal processors, or flashes (or electrical flashes).

The power management module 1088 may manage the power which is supplied to the electronic device 1001. According to an embodiment, the power management module 1088 may be implemented, for example, as at least a part of a power management integrated circuit (PMIC).

The battery 1089 may power at least one component of the electronic device 1001. According to an embodiment, the battery 1089 may include, for example, a primary cell not recharged, a secondary cell rechargeable, or a fuel cell.

The communication module 1090 may establish a direct (or wired) communication channel or a wireless communication channel between the electronic device 1001 and an external electronic device (e.g., the electronic device 1002, the electronic device 1004, or the server 1008) or may perform communication through the established communication channel. The communication module 1090 may include one or more communication processors which is operated independently of the processor 1020 (e.g., an application processor) and supports direct (or wired) communication or wireless communication. According to an embodiment, the communication module 1090 may include a wireless communication module 1092 (e.g., a cellular communication module, a short range wireless communication module, or a global navigation satellite system (GNSS) communication module) or a wired communication module 1094 (e.g., a local area network (LAN) communication module or a power line communication module). A corresponding communication module of such communication modules may communicate with an external electronic device over the first network 1098 (e.g., a short range communication network such as Bluetooth, Wi-Fi direct, or infrared data association (IrDA)) or the second network 1099 (e.g., a long distance communication network such as a cellular network, an Internet, or a computer network (e.g., LAN or WAN)). The above-described kinds of communication modules may be integrated in one component (e.g., a single chip) or may be implemented with a plurality of components (e.g., a plurality of chips) which are independent of each other. The wireless communication module 1092 may verify and authenticate the electronic device 1001 within a communication network, such as the first network 1098 or the second network 1099, by using subscriber information (e.g., international mobile subscriber identity (IMSI)) stored in the subscriber identification module 1096.

The antenna module 1097 may transmit a signal or a power to the outside (e.g., an external electronic device) or may receive a signal or a power from the outside. According to an embodiment, the antenna module 1097 may include one or more antennas, and at least one antenna which is suitable for a communication scheme used in a computer network such as the first network 1098 or the second network 1099 may be selected, for example, by the communication module 1090 from the one or more antennas. The signal or power may be exchanged between the communication module 1090 and an external electronic device through the selected at least one antenna or may be received from the external electronic device through the selected at least one antenna and the communication module 1090.

At least some of the components may be connected to each other through a communication scheme (e.g., a bus, a general purpose input and output (GPIO), a serial peripheral interface (SPI), or a mobile industry processor interface (MIPI)) between peripheral devices and may exchange signals (e.g., commands or data) with each other.

According to an embodiment, a command or data may be transmitted or received (or exchanged) between the electronic device 1001 and the external electronic device 1004 through the server 1008 connecting to the second network 1099. Each of the electronic devices 1002 and 1004 may be a device, the kind of which is the same as or different from a kind of the electronic device 1001. According to an embodiment, all or a part of operations to be executed in the electronic device 1001 may be executed in one or more external devices of the external electronic devices 1002, 1004, or 1008. For example, in the case where the electronic device 1001 should perform any function or service automatically or in response to a request from the user or any other device, the electronic device 1001 may request one or more external electronic devices to perform at least a part of the function or service, instead of internally executing the function or service or additionally. The one or more external electronic devices which receive the request may execute at least a part of the function or service thus requested or an additional function or service associated with the request, and may provide a result of the execution to the electronic device 1001. The electronic device 1001 may process received result as it is or additionally, and may provide a result of the processing as at least a part of the response to the request. To this end, for example, a cloud computing, distributed computing, or client-server computing technology may be used.

According to various embodiments, an electronic device includes image sensors configured to include a plurality of pairs of image sensors, each pair of image sensors facing in substantially the same direction and generating image data and each of which has a different field of view, a processor configured to be operatively connected to the image sensors, and a memory configured to be operatively connected to the processor. The memory stores instructions, when executed, causing the processor to receive at least one set of image data from the pairs of image sensors, recognize at least one object from the image data, determine depth information of the at least one object, and stitch the at least one set of image data using the at least one object and the depth information.

According to various embodiments, the instructions cause the processor to generate a first stitching image by performing a first stitching process of the at least one set of image data, determine whether there is the object on a combination line of the first stitching image, determine the necessity to change the combination, based at least in part on the depth information, and change the combination lie of the first stitching image based at least in part on the necessity.

According to various embodiments, the instructions cause the processor to identify depth information of a candidate combination line spaced apart from the combination line at a specified distance, when the combination line and the recognized object are overlapped with each other, and determine whether to change the combination to the candidate combination line, based on depth information of the combination line and the depth information of the candidate combination line.

According to various embodiments, the instructions cause the processor to change the combination line to the candidate combination line, when a change in the depth information of the combination line is greater than a change in the depth information of the candidate combination line.

According to various embodiments, the instructions cause the processor to change the combination line to one of a plurality of candidate combination lines arranged adjacent to the combination line, depending on specified priority information.

According to various embodiments, the instructions cause the processor to lower a priority of a candidate combination line overlapped with an object focused among the at least one object on first image data or second image data.

According to various embodiments, the instructions cause the processor to differently set the priority information depending on a size or type of the object.

According to various embodiments, the instructions cause the processor to lower a priority of a line overlapped with an object of greater than or equal to a specified size among the at least one object.

According to various embodiments, the instructions cause the processor to increase a priority of a candidate combination line overlapped with an object recognized in common from first image data and second image data among the at least one object.

According to various embodiments, an electronic device includes a communication interface configured to communicate with an external camera device including image sensors configured to include a plurality of pairs of image sensors, each pair of image sensors facing substantially the same direction and generating image data and each of which has a different field of view, a processor configured to be operatively connected to the communication interface, and a memory, wherein the memory stores instructions, when executed, causing the processor to receive at least one set of image data from the external camera device through the communication interface, recognize at least one object from the image data, determine depth information of the at least one object, and stitch the at least one set of image data using the at least one object and the depth information.

According to various embodiments, an electronic device includes a memory, a plurality of image sensors, at least some of which capture different images, and a processor configured to process image data collected by the plurality of image sensors, wherein the processor is configured to receive first and second image data from first and second image sensors, respectively, the first and second image sensors being included in the plurality of image sensors, determine a first combination line on a region where the first image data and the second image data are overlapped with each other, obtain first priority information from the first combination line, determine at least one second combination line spaced apart from the first combination at a specified distance, obtain second priority information from the second combination line, compare the first priority information with the second priority information and select one combination line, and stitch the first image data and the second image data with respect to the selected combination.

According to various embodiments, the first priority information comprises information about whether an object is overlapped with the first combination line or depth histogram information, and the second priority information comprises information about whether an object is overlapped with the second combination line or depth histogram information.

According to various embodiments, the processor is configured to lower the first priority information or the second priority information, when the first combination line or the second combination line is overlapped with an object recognized from the first image data or the second image data.

According to various embodiments, the processor is configured to differently set the first priority information or the second priority information depending on a size or type of the recognized object.

According to various embodiments, the processor is configured to lower the first priority information or the second priority information, when there is the first combination line or the second combination line overlapped with an object recognized in common from the first image data and the second image data.

According to various embodiments, the processor is configured to determine whether the first combination line or the second combination line is overlapped with an object of greater than or equal to a specified size.

According to various embodiments, the plurality of image sensors comprise at least two image sensors arranged in the same direction.

According to various embodiments, the plurality of image sensors comprise adjacent image sensors, angles of view of which are overlapped with each other.

According to various embodiments, each of the plurality of image sensors forms a specified arrangement angle with an adjacent image sensor.

According to various embodiments, the plurality of image sensors comprise $1^{st}$ to $16^{th}$ image sensors, each of which faces a different direction and is located consecutively, and the $1^{st}$ image sensor and the $4^{th}$ image sensor are arranged to face the same direction.

The electronic device according to various embodiments of the disclosure may allow a combination line not to be overlapped with an object recognized from image data to reduce the sense of difference the user may feel in the process of viewing the stitched image.

The electronic device according to various embodiments of the disclosure may reduce the sense of difference the user feels by determining whether to move a combination line, based on depth information.

The electronic device according to various embodiments of the disclosure may generate different separate stitching images for the left eye and the right eye of the user. In this case, the electronic device may reduce that the combination line is overlapped with the object on each stitching image.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
a plurality of pairs of image sensors, each pair of image sensors facing substantially a same direction and generating image data and each of which has a different field of view;
a processor operatively connected to the plurality of pairs of image sensors; and
a memory operatively connected to the processor,
wherein the memory stores instructions that, when executed, cause the processor to:
receive at least one set of image data from the plurality of pairs of image sensors,
recognize at least one object from the image data,
determine depth information of the at least one object,
determine a plurality of candidate combination lines for a single stitching operation,
stitch the at least one set of image data using the at least one object and the depth information to identify a first combination line out of the plurality of candidate combination lines, when the first combination line meets specified criteria for stitching; and
determining that the first combination line does not meet the specified criteria for stitching when the at least one object is overlapped by the first combination line and lowering a priority of the first combination line, when the first combination line overlaps the at least one object, the at least one object being recognized in any region out of a plurality of regions of the set of image data,
wherein identifying a first combination line comprises determining a stitching line from the plurality of candidate combination lines based on priority information, a feature of the at least one object, and depth histogram information from a histogram,
wherein a small interval deviation in the histogram, indicates a high priority for selecting the stitching line, and
wherein the histogram is represented by depth values on a horizontal axis and frequency of occurrence within a specific overlapping interval is represented on a vertical axis, the high priority for selecting the stitching line further indicated by a lower depth value on the histogram.

2. The electronic device of claim 1, wherein the instructions further cause the processor to:
generate a first stitching image by performing a first stitching process of the at least one set of image data,
determine whether an object is present on the first combination line of the first stitching image,
determine a necessity to change the first combination line, based at least in part on the depth information, and
change the first combination line based at least in part on the necessity.

3. The electronic device of claim 2, wherein the instructions further cause the processor to:
identify depth information of a candidate combination line spaced apart from the first combination line at a specified distance, when the first combination line and the at least one object overlap each other; and
determine whether to change the first combination line to the candidate combination line, based on depth information of the first combination line and the depth information of the candidate combination line.

4. The electronic device of claim 3, wherein the instructions further cause the processor to:
change the first combination line to the candidate combination line, when a change in the depth information of the first combination line is greater than a change in the depth information of the candidate combination line.

5. The electronic device of claim 2, wherein the instructions further cause the processor to:
change the first combination line to one of the plurality of candidate combination lines arranged adjacent to the first combination line, depending on specified priority information.

6. The electronic device of claim 5, wherein the instructions further cause the processor to:
lower a priority of a candidate combination line overlapping an object focused among the at least one object on first image data or second image data.

7. The electronic device of claim 5, wherein the instructions further cause the processor to:
set the priority information differently depending on a size or type of the object.

8. The electronic device of claim 7, where the instructions further cause the processor to:
lower a priority of a line overlapping an object of greater than or equal to a specified size among the at least one object.

9. The electronic device of claim 5, wherein the instructions further cause the processor to:
increase a priority of a candidate combination line overlapping an object recognized in common from first image data and second image data among the at least one object.

10. An electronic device, comprising:
a communication interface configured to communicate with an external camera device including a plurality of pairs of image sensors, each pair of image sensors facing substantially a same direction and generating image data and each of which has a different field of view;
a processor configured to be operatively connected to the communication interface; and
a memory,
wherein the memory stores instructions that, when executed, cause the processor to:
receive at least one set of image data from the external camera device through the communication interface,
recognize at least one object from the image data,
determine depth information of the at least one object,
determine a plurality of candidate combination lines for a single stitching operation,
stitch the at least one set of image data using the at least one object and the depth information to identify a first combination line out of the plurality of candidate combination lines, when the first combination line meets specified criteria for stitching; and
determine that the first combination line does not meet the specified criteria for stitching when the at least one object is overlapped by the first combination line and lower a priority of the first combination line, when the first combination line overlaps the at least one object, the at least one object being recognized in any region out of a plurality of regions of the image data, wherein identifying a first combination line comprises determining a stitching line from the plurality of candidate combination lines based on priority information, a feature of the at least one object, and depth histogram information from a histogram, wherein a small interval deviation in the histogram, indicates a high priority for selecting the stitching line, and wherein the histogram is represented by depth values on a horizontal axis and frequency of occurrence within a specific overlapping interval is represented on a vertical axis, the high priority for selecting the stitching line further indicated by a lower depth value on the histogram.

11. An electronic device, comprising:
a memory;
a plurality of image sensors, at least two of which capture different images; and
a processor configured to process image data collected by the plurality of image sensors,
wherein the processor is further configured to:
receive first and second image data from first and second image sensors respectively, the first and second image sensors being included in the plurality of image sensors,
determine a first combination line on a region where the first image data and the second image data overlap each other,
obtain first priority information from the first combination line,
determine at least one second combination line spaced apart from the first combination line at a specified distance,
obtain second priority information from the second combination line,
compare the first priority information with the second priority information,
select one combination line based on a result of the comparison, and
stitch the first image data and the second image data with respect to the selected combination line, when the selected combination line meets specified criteria for stitching; and
determine that the selected combination line does not meet the specified criteria for stitching when at least one object in the image data is overlapped by the first combination line and lower a priority of the selected combination line, when the selected combination line overlaps the at least one object, the at least one object being recognized in any region out of a plurality of regions of the image data, wherein selecting one combination line comprises determining a stitching line from first combination line and the second combination line based on priority information, a feature of the at least one object, and depth histogram information from a histogram, wherein a small interval deviation in the histogram, indicates a high priority for selecting the stitching line, and wherein the histogram is represented by depth values on a horizontal axis and frequency of occurrence within a specific overlapping interval is represented on a vertical axis, the high priority for selecting the stitching line further indicated by a lower depth value on the histogram.

12. The electronic device of claim 11,
wherein the first priority information comprises information about whether an object overlaps the first combination line or depth histogram information, and
wherein the second priority information comprises information about whether an object overlaps the second combination line or depth histogram information.

13. The electronic device of claim 12, wherein the processor is further configured to:
lower the first priority information or the second priority information, when the first combination line or the second combination line overlaps an object recognized from the first image data or the second image data.

14. The electronic device of claim 13, wherein the processor is further configured to:
set the first priority information or the second priority information differently depending on a size of the recognized object.

15. The electronic device of claim 14, wherein the processor is further configured to:
lower the first priority information or the second priority information, when the first combination line or the second combination line overlaps an object recognized in common from the first image data and the second image data.

16. The electronic device of claim 13, wherein the processor is further configured to:
determine whether the first combination line or the second combination line overlaps an object of greater than or equal to a specified size.

17. The electronic device of claim 11, wherein the plurality of image sensors comprise at least two image sensors arranged in a same direction.

18. The electronic device of claim 11, wherein the plurality of image sensors comprise adjacent image sensors having overlapping angles of view.

19. The electronic device of claim 11, wherein each of the plurality of image sensors forms a specified arrangement angle with an adjacent image sensor.

20. The electronic device of claim 11,
wherein the plurality of image sensors comprise first to sixteenth image sensors, each of which faces a different direction and is located consecutively, and
wherein the first image sensor and the fourth image sensor are arranged to face a same direction.

21. The electronic device of claim 13, wherein the processor is further configured to:
set the first priority information or the second priority information differently depending on a type of the recognized object.

* * * * *